United States Patent [19]

Johnson

[11] 3,725,843

[45] Apr. 3, 1973

[54] BUSSING CONSTRUCTION FOR PRINTED CIRCUIT CONNECTORS

[75] Inventor: Lennart B. Johnson, Topsfield, Mass.

[73] Assignee: Teradyne, Inc., Boston, Mass.

[22] Filed: July 6, 1971

[21] Appl. No.: 159,732

Related U.S. Application Data

[63] Continuation-in-part of Ser. No. 32,570, April 28, 1970, abandoned.

[52] U.S. Cl. ..............339/19, 339/17 LM, 339/22 B, 339/176 MP, 339/258 R, 317/101 DH

[51] Int. Cl. ..............H05k 1/07

[58] Field of Search.....317/101 CC, 101 DH; 339/14 R, 339/14 P, 17 L, 17 LM, 17 M, 19, 22 B, 176 MP, 176 MF

[56] References Cited

UNITED STATES PATENTS

| | | | |
|---|---|---|---|
| 2,891,229 | 6/1959 | Flanagan | 317/101 DH |
| 3,431,545 | 3/1969 | Kirby | 339/258 P |
| 2,997,685 | 8/1961 | Anderson | 339/22 B |
| 3,147,404 | 9/1964 | Sinner | 317/101 DH |
| 3,176,261 | 3/1965 | Greco et al. | 339/17 LM |
| 3,323,099 | 5/1967 | Spera | 339/14 R |
| 3,368,117 | 2/1968 | Pond et al. | 317/101 DH |

*Primary Examiner*—Marvin A. Champion
*Assistant Examiner*—Lawrence J. Staab
*Attorney*—Herbert W. Kenway et al.

[57] ABSTRACT

A bussing construction for printed circuit card connectors arrayed on the front face of a panel forming a connector plane provides bus bars above the plane and extending adjacent the connector ends, with clips on the connectors mounting the bus bars to the connectors. The connectors also mount distribution conductors above the connector plane and connecting the bus bars to distribution contacts seated in the connector sockets.

11 Claims, 11 Drawing Figures

INVENTOR.
LENNART B. JOHNSON

Kenway, Jenney & Hildreth
ATTORNEYS

INVENTOR.
LENNART B. JOHNSON

Kenway, Jenney & Hildreth
ATTORNEYS

INVENTOR
LENNART B. JOHNSON
BY
Kenway, Jenney & Hildreth
ATTORNEYS

INVENTOR
LENNART B. JOHNSON
BY
Kenway, Jenney & Hildreth
ATTORNEYS

BUSSING CONSTRUCTION FOR PRINTED CIRCUIT CONNECTORS

This application is a continuation-in-part of the commonly-assigned pending application Ser. No. 32,570 filed Apr. 28, 1970 for COMMON BUSSING, and now abandoned.

BACKGROUND

My invention relates to printed circuit card connectors and particularly to connectors adapted to be employed in a dense, compact array on the front face of a connector plane. The connectors are suited particularly for common bussing of a voltage or other signal to the connectors in the array by a bus bar located on the front face of the connector plane.

A number of bussing or power distribution techniques have been suggested and employed in the prior art to distribute an electrical signal to a plurality of connectors which are mounted, in an array, to a connector plane of aluminum or other material employed for this purpose. The connectors are mounted to the plane so that their sockets are exposed at the front face of the plane while their connecting terminals, or contact tails, extend through the plane and protrude beyond the back face of the plane. Because of the increasing tendency toward miniaturization and compact arrangement of electronic components it is common to employ a connector plane having a large number of connectors, and literally thousands of miniaturized contact tails protruding beyond the back face of the connector plane in a close, compact arrangement.

One bussing technique employed in the prior art is to locate a bus bar on the back face of the connector plane and to connect it directly to the selected contact tails. Fasteners are provided to secure the bus bar to the selected contact tails, these fasteners usually being formed integrally with the bus bar at spaced intervals along the bus bar which correspond to the intervals between the contact tails which are to be connected in common. For example, such a fastener may consist of an eyelet which receives the selected contact tail, there being a number of such eyelets spaced along the length of the bus bar. When employing this technique of common bussing it is essential that the connectors be located precisely on the connector plane so that the selected contact tails will register with the fasteners on the bus bars. In addition to requiring a high degree of precision in locating the connectors, the presence of the bus bars in proximity to the other contact tails of the connector may hamper access to the other contact tails so that some of the contact tails may be unusable.

With these problems in mind, it is among the objects of my invention to provide a technique for common bussing to a plurality of connectors in which each bus bar is located on the front face of the connector plane so that it does not interfere with the contact tails on the back face of the plane, thus enabling all of the contact tails to be used. Additionally, it is among the objects of my invention to provide a bussing technique which can employ a bus bar having no projections, fasteners or the like but which consists of a simple, plain rod or bar.

Other techniques for common bussing having been employed in which the bus bar is located on the front face of the plane and does not interfere with the contact tails on the back face of the plane. In this arrangement a number of connectors are arranged in a row and a means, such as a slot, is provided to enable the bus bar to be inserted transversely through the body of each connector in the row. The bus bars employed in this technique are provided with contact tails, formed integrally therewith at spaced intervals corresponding to the intervals between the connectors in the row. Each integral contact tail extends downwardly through the bottom of its associated connector and protrudes beyond the back face of the plane where the protruding contact tail is connected electrically to the desired voltage or other electrical signal. Thus, in this arrangement, it is necessary to fabricate the bus bar integrally with its contact tails which must be spaced at precise intervals along the bus bars that are equal to the spacing between the connectors in the row. In the event that any of the integrally formed contact tails break or otherwise become unusable the entire bus bar must be replaced. Additionally, because the bus bar in this arrangement passes directly through the body of the connector and may extend through the socket, it is necessary to form a slot in the circuit card so that it can fit in the connector socket about the bus bar. Finally, special contacts must be provided within the socket to connect electrically the bus bar and the selected terminal on the circuit board. It should be noted, in addition, that when it is desired to replace, rearrange or remove the bus bar, the circuit cards must first be removed to enable the bus bar and its integral contact tails to be removed upwardly away from the connector.

Accordingly, it is among the objects of my invention to provide a bussing technique in which the bus bar is readily accessible on the front face of the connector plane so that the bus bar may be removed, replaced or repositioned without requiring rearrangement or removal of other components of the connector array. An additional object of my invention is to provide a common bussing arrangement for a connector array which does not require that the circuit board be modified in any way.

GENERAL DESCRIPTION

Connector equipment in accordance with the invention provides conductive bus bars which serve plural connectors of printed circuit boards and like structures, and provides electrical connections between the bus bars and the connector contacts. The bus bars and bus bar-contact connections are all carried by the connectors. Further, they are all above the connector plane and hence do not use conductors fastened to the wire-wrap tails of any contacts. Further, the bus bars and the connections from them to connector contacts do not thread under the printed circuit structures plugged into the connectors. Also, the bus bars and these connections can be altered, removed or installed with minimal disturbance to other parts or connections.

In accordance with one embodiment of the invention I employ an array of connectors mounted on a connector plane in an end-to-end and row-to-row configuration. The ends of the connectors are constructed so that when they are so arranged, an aisle is defined between the adjacent ends of adjacent connector rows. The bus bars are disposed within and extend along the aisles and special clips are provided at the adjacent ends of the connectors to grip and engage electrically the bus bar at intervals along its length. There is no need to provide a bus bar having fasteners or other integrally formed, precision spaced elements.

The bus bar need not be registered precisely with respect to the connectors or their associated contact tails. It is necessary only to ensure that the bus bar extends along the desired length of the aisle. Thus, although it may be desirable, for other reasons, to locate each connector precisely in a desired position on the connector plane, it is not necessary to do so merely to accommodate the bus bar. All that is required for accommodation of the bus bar is that the connectors be arranged to provide an aisle between the adjacent connector rows and that the connector employ special end clips which face the aisle and engage the bus bar.

The connectors employed in some embodiments of my invention are conventional in all respects except that specially formed clips are provided at the exterior of each end of the connector so that when the connector is disposed in end-to-end orientation with another connector, the special clips at adjacent ends of the connectors will be exposed to the aisle and may grip and contact electrically a bus bar extending along the aisle. Distribution conductor means are provided for connecting the end clips to a selected contact disposed within the connector socket so that the voltage or signal at the bus bar can be distributed to a selected terminal on the circuit card. The end clip and contact can be formed integrally from a single piece of conductive material and means are provided for securing the end clip and its associated socket contact to the insulated body of the connector.

In another embodiment of the invention, each connector carries a clip that seats a bus bar; aisles between rows of arrayed connectors are not required. Further, each connector carries a distribution conductor extending from a bus bar mounted to that connector and alongside the row of connector contacts that engage the printed circuit board. A distribution contact that connects to the distribution conductor replaces the conventional connector contact where there is to be an electrical connection between the bus bar and the printed circuit board.

One object of my invention is to provide a technique for common bussing to a plurality of connectors in a dense, compact array and in which the bus bars are readily accessible.

Another object of my invention is to provide a bussing technique in which a firm electrical connection is provided between the bus bars and the connectors in an array without the aid of special fasteners yet which enables the bus bars to be removed simply and without disturbing or removing other elements in the connector array.

An additional object of my invention is to provide a technique for common bussing to a plurality of printed circuit cards which does not require that the circuit cards be modified to conform to the bussing arrangement.

Also among the objects of my invention is to provide a technique for bussing to a connector array which does not require that the connectors be located with particular precision in order to conform to the precise spacing of fasteners or other elements located at precise intervals along the bus bar.

A further object of my invention is to provide a technique for bussing to a connector array which does not interfere with the contact tails on the back of the connector so that each of the contact tails may be utilized effectively.

Another object of my invention is to provide a versatile and flexible bussing technique which employs connectors of a relatively simply and economical construction.

BRIEF DESCRIPTION OF DRAWINGS

Other objects and advantages of my invention will be apparent from the following description thereof, with reference to the accompanying drawings wherein.

DESCRIPTION OF ILLUSTRATED EMBODIMENTS

Figure 1:
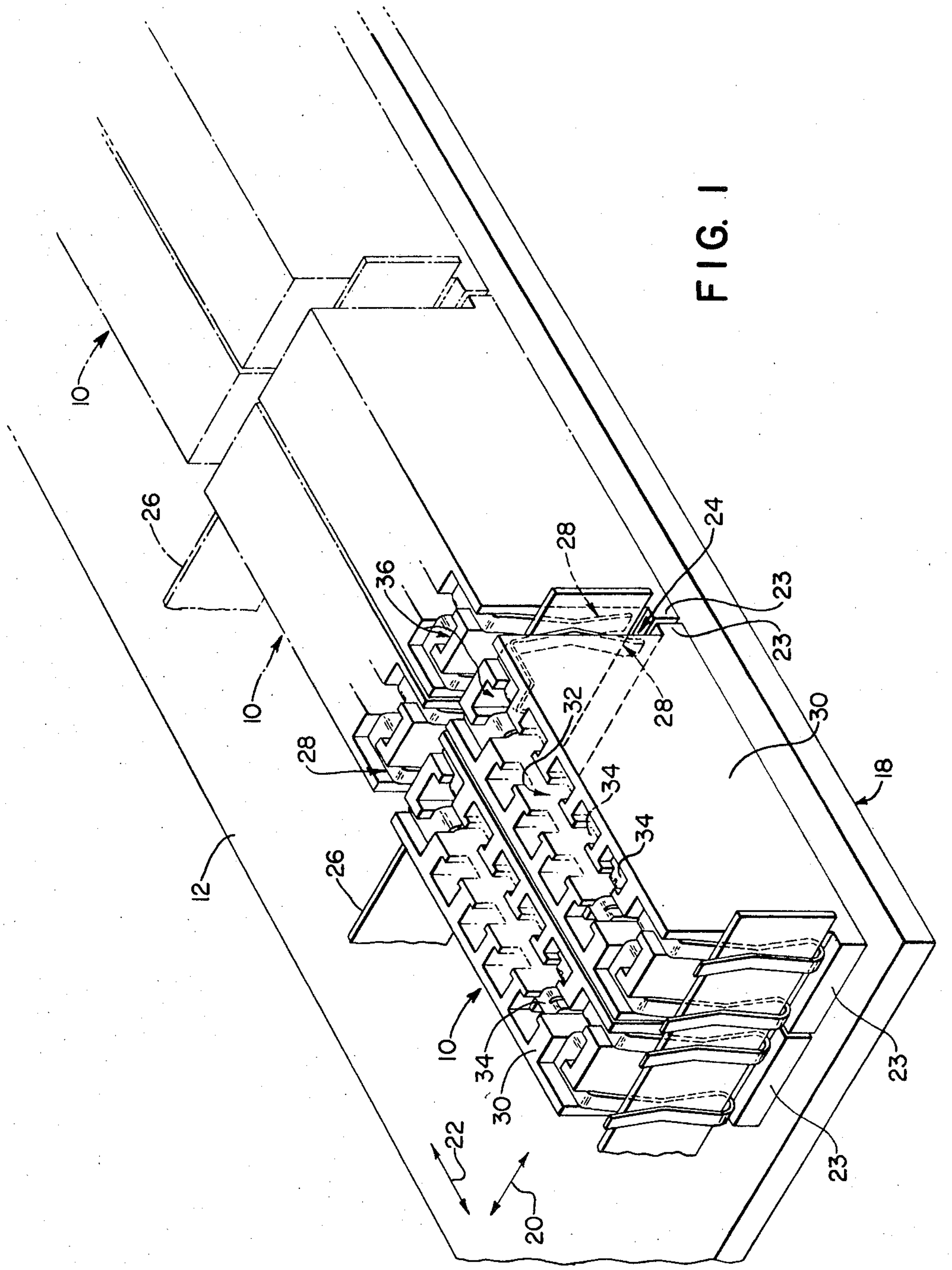
FIG. 1 is a view of connectors arranged in a row-to-row and end-to-end array and employing the bussing technique in accordance with my invention.

As shown in FIG. 1 a plurality of connectors 10, adapted to receive printed circuit boards, are mounted to a connector plane 12, which may be formed from aluminum or other suitable material. The connectors 10 are mounted on the front face 14 of the connector plane 12, there being a number of holes formed in the connector plane to enable the contact tails 16 (FIG. 3) of the connectors 10 to protrude beyond the back face 18 of the connector plane 12. The rows of connectors 10 are considered as being arranged lengthwise, as indicated by the arrow 20, and the end-to-end arrangement of the connectors 10 is considered as being widthwise along the direction indicated by the arrow 22. The connectors 10 are arranged in rows which in turn are spaced lengthwise of each other to define the aisles 24 which extend along the full length and between the adjacent rows. A bus bar 26 is intended to be received within the aisle 24 so that it can supply the same voltage or signal to each connector on either side of the aisle 24. Each connector 10 is provided with special end clips, indicated generally by the reference character 28. When the connectors 10 are arranged properly, the end clips 28 of adjacent connectors face each other and are exposed to the aisle to engage the bus bar 26. It may be noted that, although in most instances the connectors 10 are arranged in a row-to-row and end-to-end array, the bussing technique described herein can be employed even if the connectors 10 are not aligned in a widthwise, end-to-end orientation and can be employed, for example, when the connectors of one row are staggered widthwise with respect to the connectors of an adjacent row as long as the aisle 24 is defined therebetween and the special contacts 28 of the adjacent rows are exposed to the aisle 24. This is in contrast to the arrangements proposed in the prior art in which, because the bus bar includes integrally formed fasteners, contact tails or other elements which cooperate with each connector in the array and which are located on the bus bar at fixed precise intervals, the arrangement of connectors 10 is fixed to accommodate the particular bus bar and may not be varied therefrom. In this respect my invention provides a relatively high degree of flexibility in that if it becomes necessary to rearrange the positions of the connectors within the rows, the bussing arrangement will not be affected and need not be modified or replaced.

Figures 2, 3, 4, 5:
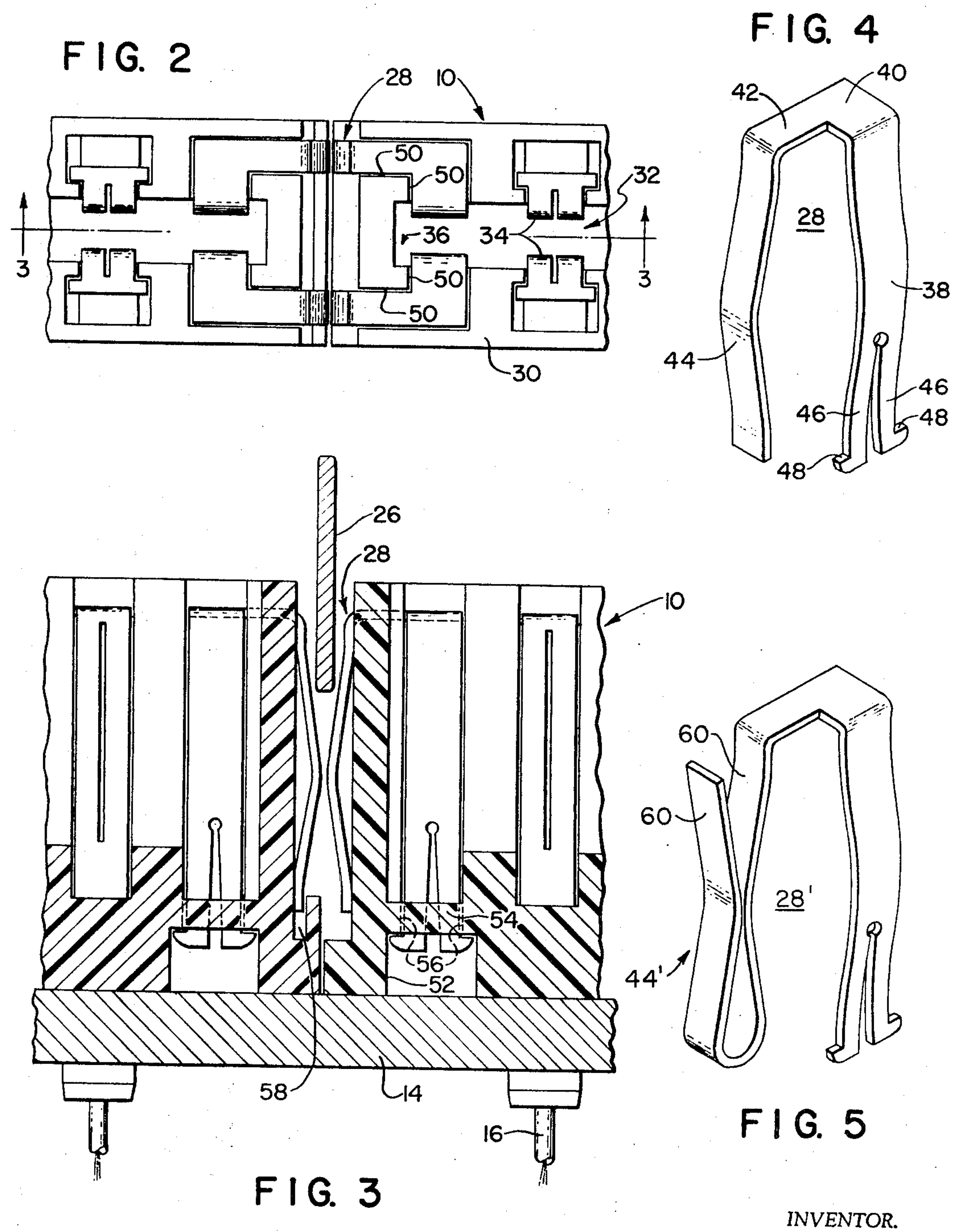
FIG. 2 is a plan view of the adjacent ends of a pair of connectors arranged in end-to-end configuration.
FIG. 3 is a sectional view of the end-to-end connectors as seen along the line 3—3 of FIG. 2.
FIG. 4 is an illustration of an integrally formed end clip and terminal employed in my invention.
FIG. 5 is an illustration of a modified end clip similar to that of FIG. 4 but which is adapted for use on the free end of a connector.

The construction of the connectors 10 and, in particular, the end clips 28, is illustrated with greater clarity in FIGS. 2 and 3. Each connector 10 includes an insulative body 30 having a socket 32 formed therein for reception of the printed circuit card (not shown). A number of contacts 34 are mounted in the connector socket 32 so that they can engage the opposite sides of the margin of the circuit card on which contact terminals have been etched or otherwise formed. Each contact 34 is provided with a contact tail 16 which protrudes through the connector plane beyond the back face 18 thereof so that a wire lead can be wrapped about or otherwise connected to the protruding contact tail 16. The ends of the socket 32 terminate in heightwise extending slots 36 which receive and guide the edges of the circuit card when inserted into the socket 32. In accordance with the invention, the special end clips 28, which can be constructed as shown in FIG. 4, are lccated at the ends of the connectors 10 and means are provided for connecting electrically each end clip 28 with a selected contact located within the socket 32. A preferred embodiment is shown in FIG. 4 in which the end clip 28 is formed integrally with its associated socket contact from a resilient conductor such as beryllium copper or other material suited for use as an electrical contact. The end clip 28 includes an internal contact 38 which is intended to be disposed heightwise within and at one side of the socket 32 and, preferably, in proximity to the end of the connector. The midportion of the internal contact 38 is bowed to press firmly against the terminals of a circuit card inserted into the socket 32. The upper portion 40 of the contact 38 is bent substantially normal to the heightwise axis of the internal contact 38 and a connecting segment 42 extends from the upper portion 40 of the clip 28 lengthwise and toward the end of the connector. The bus contact 44 is formed integrally with the connecting segment 42 and extends downwardly in substantially parallel relation to the internal contact 38 and the midportion of the bus contact 44 is bowed outwardly to ensure firm electrical contact with the bus bar 26. As described in greater detail below, the lower, free end of the internal contact 38 is provided with bifurcations 46, each bifurcation 46 having a locking tine projecting therefrom for securing the clip 28 to the connector.

The insulative body 30 of the connector 10 is provided with a pair of L-shaped depressions 50 at the top surface of each end of the connector. Each depression 50 is adapted to receive the portions 40 and 42 of an end clip 28 in such a manner that the internal contact 38 protrudes downwardly into the socket 32 and the bus contact 44 protrudes downwardly and exteriorly of the end of the connector.

The end clip 28 is secured in place by means of the bifurcations 46 and locking tines 48 formed on the lower end of the internal contact 38. The underside of the insulative body 30 is provided with a cut-away portion or slot 52 located beneath the position at which the internal contact 38 is intended to be located, thus defining a bottom wall 54 between the lower surface of the socket 32 and the upper surface of the slot 52. Another slot 56, of length slightly greater than the width of the internal contact 38, is formed in the bottom wall 54 so that as the contact 38 is inserted downwardly into the socket 32 the bifurcations 46 may be squeezed together to permit the locking tines 48 to pass through the slot 56. When in position, the locking tines 48 will be clear of the bottom wall 54 and the resilience of the bifurcations 46 will spring the locking tines 48 apart to secure the lower end of the contact 38 to the connector. When the clip 28 is locked in place the bus contact 44 will extend downwardly along the exterior end of the connector. The free, lower end of the bus contact 44 can be retained in an upwardly opening slot 58 formed integrally with the connector. This, however, is not necessary, but when employed care should be taken to ensure that the slot 58 is deep enough to accommodate any downward expansion of the bus contact 44 when engaged by the bus bar 26.

The end clip 28 as described thus far is intended primarily for use in association with another, identical connector 10 employing an identical end clip, the connectors being disposed in end-to-end relation so that their bus contacts 44 may cooperate to grip and engage electrically a bus bar 26 inserted downwardly therebetween. When it is desired to provide a common bus to a number of connectors 10 in an end row, the end clip may be modified as shown in FIG. 5. The modified end clip 28′ is identical to the end clip 28 except that a substantially U-shaped bus contact 44′ is substituted. The legs 60 of the end bus contact 44′ are bent to define a pinched midportion to grip effectively the bus bar 26 when it is inserted into the bus contact 44′ as shown in FIG. 1.

From the foregoing it will be appreciated that I have provided a connector for a circuit card which is particularly suited for use in a compact array with other connectors and which employs a special end contact or end clip to enable a bus bar to be connected commonly to the connectors in the array. The end clips are disposed on the front face of the connector plane so as not to interfere with the contact tails on the back face of the contact plane. Additionally, there are no special fasteners which must be employed to connect the bus bar to the clips and the bus bars may be removed, replaced or rearranged with utmost simplicity. It should be appreciated further that the integrally formed end clips and socket contacts may be removed or replaced readily from the front face of the array, should this be desired.

FIGS. 6 through 11 show a further embodiment of the invention which enables a bussing conductor to connect electrically to any one or more contacts of a connector for printed circuit structures. All the connections and conductors are above board, i.e. are above the panel on which the connector is mounted and from which the printed circuit structure extends, and can be modified with minimal disturbance of the remainder of the connection and wiring structure associated with the connector.

Figures 6, 7, 8:
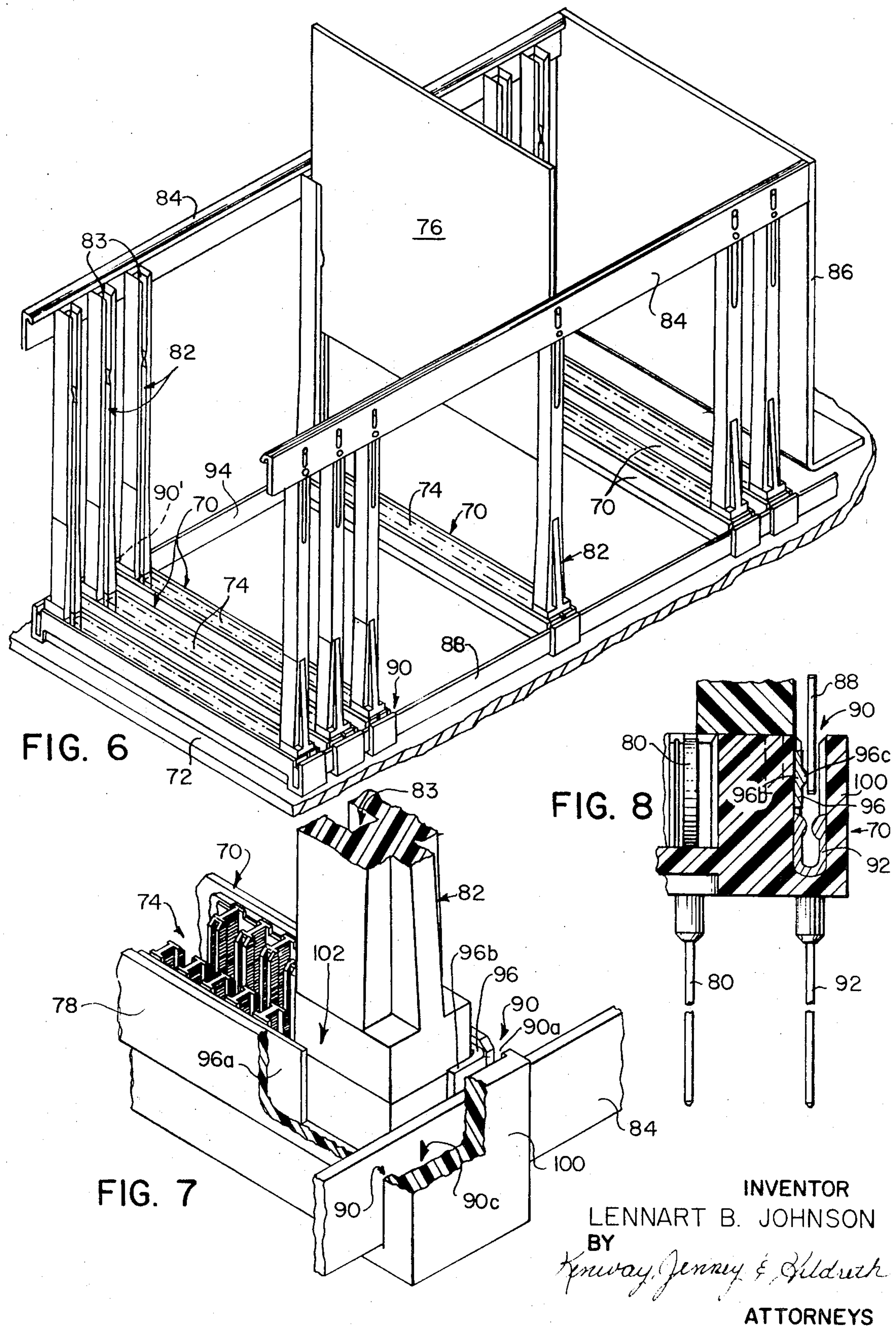
FIG. 6 is a perspective view of another connector construction embodying the invention.
FIG. 7 is an enlarged fragmentary view taken from FIG. 6.
FIG. 8 is a cross-sectional view of the bus bar-distribution conductor connection in the equipment of FIG. 6.

In particular, FIGS. 6 and 7 show connectors 70 arranged side-by-side in a row and mounted on a panel 72 which forms a connector plane. Each connector is recessed with an elongated socket 74 in which it receives the edge of a printed circuit card 76 or other printed circuit structure. The socket 74 extends longitudinal to the insulated body 78 of the connector and extends transverse to the extension of the row of side-by-side connectors. Contacts 80, 80 are seated in the connector body 78 in two rows on either side of the socket 74 in the conventional manner to make electrical contact with contacts on the printed circuit card 76 along the card edge seated within the socket.

Each illustrated connector 70 has a pair of upstanding card guides 82, 82 on it beyond each end of the socket 74 and recessed with a guide channel 83 to receive, guide and support the printed circuit card 76. Interconnecting straps 84, 84 are fastened to the upper free ends of the card guides 82; a tie-down member 86 fastens the straps 84 to the panel 72. U.S. Pat. application Ser. No. 159,786 filed on the same day as this application and commonly assigned, in the name of Lennart B. Johnson and entitled RECEPTACLE FOR PRINTED CIRCUIT STRUCTURES, describes a preferred construction of the card guides, tie-down members and associated connector construction in further detail.

With further reference to FIGS. 6, 7 and 8, the body 78 of each connector 70 extends longitudinally beyond each end of the card-receiving socket 74 to mount a card guide 82 on the connector. The connector body extends still further, atone end **78*a* at least, to provide a mounting attachment for a conductive bus bar 88. The illustrated mounting attachment for a strip-like bus bar is a clip 90 extending across the width of the receptacle body and molded of insulating material integral with the body. The clip defines a slot that faces in the same direction as the socket 74 and that has a height as great as the bus bar height to fully receive the bus bar therein. The clip-formed slot has thin end sections 90*a* and 90*b* which have equal widths close to the thickness of the bus bar for a snug or even slight interference fit of the bus bar within the end sections. As shown in FIG. 8, a longitudinal median slot section 90*c* has a larger width, to accommodate a contact 92. The contact 92, which is seated in the bottom wall of the clip 90, has a convention wire-wrap tail extending below the connector 70 and panel 72, and has an upper end within the clip which is bifurcated to form a pair of contacts. The lower edge of the bus bar 88** seats in the bifurcation between these contacts, which engage it for electrical contact.

In this manner, the connector 70 mountingly receives and attacheS a ribbon-like bus bar to it from above the panel 72 and outboard from the printed circuit structure seated in the connector. The bus bar can be inserted into, and alternatively removed from, the connector without disturbing the printed circuit cards or any other elements of the connection structure. The contacts 92 are optional, typically being provided only where it is desired to provide a connection between wire-wrapped conductors below the panel 72 and the bus bar 88. The connector clip seatingly receives the bus bar and mounts it in replaceably removable manner. The clip is disposed longitudinally beyond and exterior of the connector socket.

FIG. 6 shows that the bus bar 88 feeds all the connectors 70 which are in the same row; they support the bus bar above and insulated from the panel. The connectors 70 in the illustrated connection structure have, in addition, clips 90' on the other ends thereof and a further bus bar 94 is seated therein; where desired the two bus bars can be maintained electrically isolated from each other.

FIGS. 6 and 7 show distribution conductors 96, 96 seated in the connector body 70 and which provide electrical connections between the bus bars and any one or more contacts of the printed circuit board via distribution contacts seated in the connector in lieu of contacts 80. Each distribution conductor is seated in a slot 98 receSsing the upper, socket-recessed face of the connector body 78, and each illustrated connector has two such slots. Each slot 98 extends alongside socket 74 spaced from it by a row of socket contacts and by an insulating wall 104 of the connector body. Further, the slots extend along the full length of the connector body between the two end walls 100, 100 that form part of the clips 90, 90'; and hence each illustrated slot runs into the median sections of both clips.

Each illustrated distribution conductor 96 connects to only one bus bar 88, 94; and each interconnected bus bar and distribution conductor is electrically isolated from the other. As shown in FIGS. 7 and 8, each distribution conductor is a strip-like electrical conductor which has an elongated distribution section **96*a* from which a short connection tab 96*b* transversely extends at an end. The conductor mounts on a connector 70 with the distribution section fitting within a slot 98 and the tab extending from the end of the slot into the median section of the adjoining clip 90 or 90'. The tab has a detent 96*c* that protrudes into the slot within the clip to bear against and electrically contact the bus bar seated therein. The distribution section 96*a* is shorter than the slot 98 to space the end of the distribution section 96*a* distal from the tab 96*b* from the adjacent bus bar by a gap 102. This provides the above-noted isolation between the two bus bars. However, this isolated arrangement is only illustrative. Where desired, each distribution conductor can have a tab 96*b*** on each end and extend between and connect electrically to both bus bars.

Figure 10:
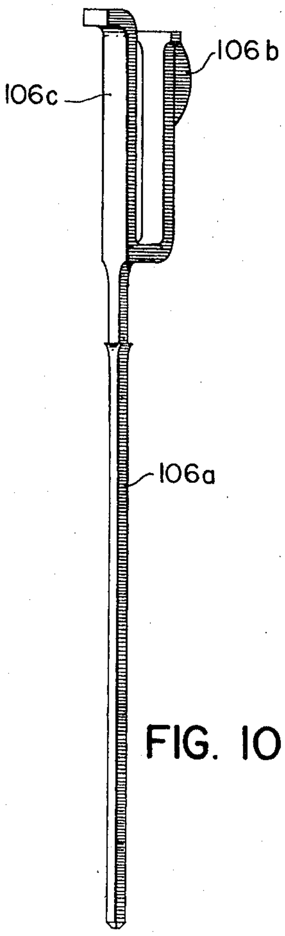
FIG. 10 is another view of one distribution contact in FIG. 9.
Figure 9:
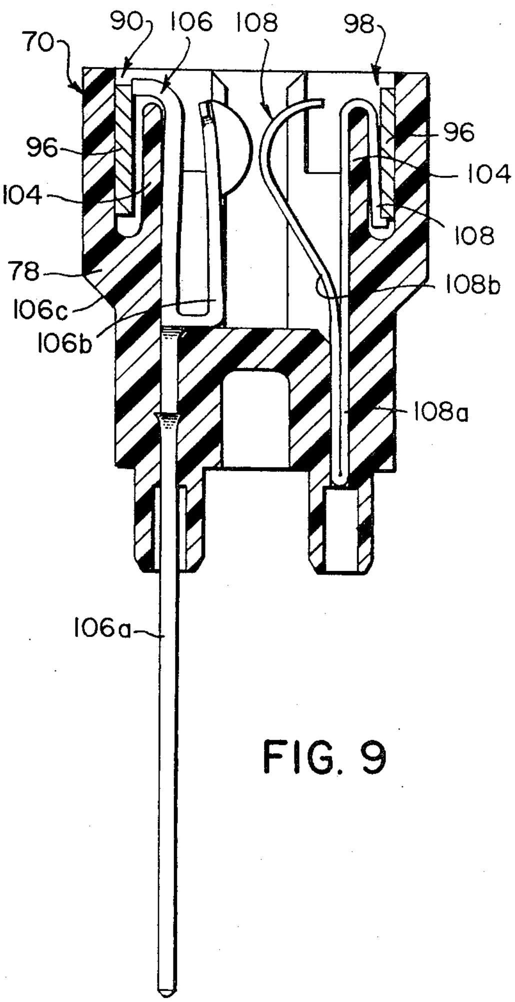
FIG. 9 is a cross-sectional view of a connector in FIG. 6 showing two alternate forms of distribution contact.

At least one end of each distribution conductor 96 is thus connected to a bus bar within the body of the connector 70. Further, the connector body includes the wall 104 of insulating material between the contacts 80 arrayed along each side of the socket 74 and each slot 98. This construction electrically insulates the contacts 80 from the distribution conductors 96 and hence from the bus bars.

Where the connector is to provide electrical connection between a distribution conductor 96 and a contact on a printed circuit board seated in the socket 74, the conventional connector contact 80 is replaced by a distribution contact. FIG. 9 shows two distribution contacts 106 and 108, and FIG. 10 shows a further view of the contact 106.

The distribution contact 106 seats within the connector body 78 in a manner similar to a contact 80 with a barbed locking shaft section 106*a* from which a wire-wrap tail extends through and beyond the bottom wall of the connector body. Two resilient contact arms 106*b* and 106*c* extend upwardly from the shaft section 106*a*. The contact arm 106*b* forms a contact surface resiliently biased into the socket 74 for making electrical connection with a contact on the printed circuit board in the same manner as each contact 80. The contact arm 106*c* extends upWard alongside the contact arm 106*b* and beyond it to above the wall 104 and protrudes into the adjacent slot 98 for connection with the distribution conductor 96 therein. The distribution contact 106 is formed with the contact arm 106*c* normally protruding well into the slot 98 and engagement with the distribution conductor 96 seated therein bows the arm 106*c* toward the associated arm 106*b*, as indicated in FIG. 9.

With further reference to FIG. 9, the distribution contact 108 likewise has a shaft section 108*a* which locks the contact into the connector body and from which contact arms 108*b* and 108*c* extend upward. The arm 108*b* resiliently protrudes into the socket 74 for effecting electrical connection with a contact on the printed circuit board plugged into the connector. The arm 108*c* extends upward over the wall 104 for connection with a distribution conductor in the adjacent slot 98. Further, the illustrated contact arm 108*c* extends doWn into the slot 98 to the bottom thereof, and hence engages the distribution conductor 98 along both the bottom edge and one side, as shown. The illustrated contact 108 is fabricated by folding an elongated conductive rod and is shown with no wire-wrap tail, although tuP is merely by way of illustration.

The foregoing arrangement of bus bars and distribution conductors and distribution contacts which the invention provides is all mounted on and carrled by the connectors 70, and it makes all electrical connections, except for wire-wrap connections, above the panel 72. Further, all connections between the bus bars and the printed circuit board contacts, made by way of the distribution conductors and the distribution contacts, are made without reference to or use of wire-wrapped conductors or other special conductors engaging the wire-wrap tails. Still further, these connections between the bus bars and the printed circuit contactS do not involve conductors running under or otherwise traversing the printed circuit boards, as found in the prior art. Also, the connection equipment of the invention enables the electrical connection of any one or more receptacle contacts with the bus bars; and these connections can be changed simply by removing the conventional receptacle contact 80, which does not electrically engage a distribution conductor, and replacing it with a distribution contact such as the contacts 106 and 108 shown in FIG. 9. Conversely, removal of a connection to a distribution conductor involves inserting a receptacle contact 80 in place of a distribution contact; and all of these changes can be made from above the panel 72 and without involving or altering any wire-wrapped connections other than those engaged with a wire-wrap tail on a contact being changed.

Figure 11:
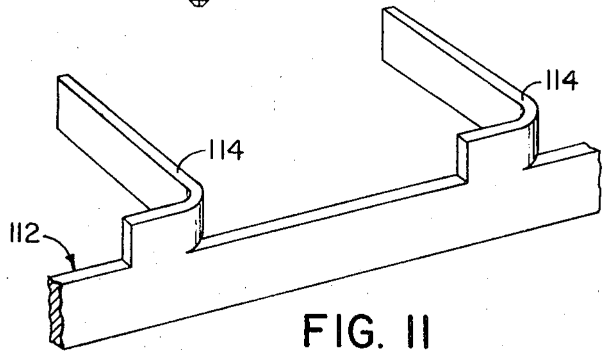
FIG. 11 is a fragmentary perspective view of an alternate form of bus conductor for use in practicing the invention.

As a further illustration of the flexibility of the invention, FIG. 11 shows an alternative construction for a bus bar. The bus bar 112 includes distribution arms 114 extending transversely from it. When this modified bus bar is seated in the receptacle clips 90, the distribution arms extend within the adjacent ends of the receptacle slots 98. From there, the distribution arms can engage distribution contacts and/or can engage distribution conductors that extend further along the receptacle slots.

The illustrated bus bar 112 is Stamped from a single strip of metal and the length of each distribution arm is limited by the spacing between adjacent receptacles 70, and/or between the connector 70 slots 98.

It should be understood that in the foregoing description and in the following claims terms such as "up", "-down", "length", "width", etc. have been used merely for ease in explaining the relative positions and locations of the parts.

It should be understood also that the foregoing description is merely illustrative of my invention and that other embodiments and modifications thereof will be apparent to those skilled in the art without departing from its spirit.

Having thus described my invention, what I claim as new and secured by Letters Patent is:

1. A connector having an upwardly opening socket and seating a plurality of contacts within said socket to engage electrically contacts of a circuit card inserted into said socket, said connector being adapted for mounting to a panel member with the circuit card disposed on one side of the panel surface, said connector having the improvement comprising A. a resilient end clip on said connector exteriorly of said connector socket at one end thereof for seatably receiving a bus conductor and mounting it in replaceably removable manner with said connector, said end clip having a bus contact bowed at a midportion in a direction away from said connector socket, so that when said connector is arranged in end-to-end abutment with another connector having a similar end clip, the opposed bowed bus contacts of said connector end clips can receive and electrically engage a common bus bar interposed between them and between said adjacent ends of said connectors, B. a bus conductor mountingly received in said clip and disposed thereby on said one side of said panel surface and extending transverse to said connector socket and electrically engaged with said bus contact of said clip, and C. conductor means mounted to said connector and connecting electrically, by way of said bus contact, said bus bar mounted with said end clip to a selected contact seated within said socket.

2. A connector having an upwardly opening socket and seating a plurality of contacts within said socket to engage electrically contacts of a circuit card inserted into said socket, said connector being adapted for mounting to a panel member with the circuit card disposed on one side of the panel surface, said connector having the improvement comprising A. a resilient end clip on said connector exterior of said connector socket at one end thereof for seatably receiving a bus conductor and mounting it in replaceably removable manner with said connector, B. a bus conductor mountingly received in said clip and disposed thereby on said one side of said panel surface and extending transverse to said connector socket, and C. conductor means mounted to said connector and connecting electrically said bus bar mounted with said end clip to a selected contact seated within said socket, said conductor means being formed integrally with said selected socket contact and joined thereto to a connecting segment, the free ends of said conductor means and of said selected contact extending in substantially parallel directions from said connecting segment in a U-shaped configuration with said free end of said selected contact extending downwardly into said socket, and said connecting segment extending horizontally beyond the end of said connector with said free end of said conductor means protruding downwardly from said connecting segment exteriorly of said connector socket.

3. A connector as defined in claim 2 wherein said end clip has a substantially U-shaped portion disposed exteriorly of said connector socket for seatably receiving therein said bus conductor.

4. A connector as defined in claim 2 further comprising means securing said downwardly extending socket contact to said connector.

5. A connector as defined in claim 2 wherein said downwardly extending end of said socket contact is bifurcated to define diverging locking tines, said tines being resilient to be urged together and pass through a constricting slot formed in the bottom wall of said connector socket and said tines further engaging the external side of said bottom wall thereby to secure said socket contact to said connector and preclude removal upwardly outward from said socket.

6. A connector as defined in claim 2 having the further improvement wherein said connector normally seats first contacts aligned along said socket in electrical isolation from said conductor means, and said selected contact is seated in said socket in lieu of a first contact and in line with other first contacts.

7. In an array of plural connectors, each of which has a socket along and within which is seated a plurality of contacts for engaging contacts of a printed circuit board received in the socket, an improved bussing structure comprising A. panel means mounting said connectors in an end-to-end and row-to-row array in which the opposed ends of two adjacent rows of connectors define an aisle between them, B. an end clip on at least one end of each connector and disposed exteriorly of said socket therein, and cooperating with an identical, opposed end clip on the adjacent end of another connector to mountingly engage between said opposed end clips a bus bar inserted between said adjacent ends of said connectors, C. distribution conductor means on each connector connecting electrically said bus bar engaged with said end clip thereon and at least one contact disposed in the socket of that connector D. whereby a single bus bar extending along said aisle provides a common bus bar to all of the connectors in said adjacent rows.

8. In electrical connector apparatus for printed circuit structures having electrical edge contacts, and having a connector with an electrically-insulating body recessed with a longitudinal socket and for mounting on a panel with said socket facing from one side of said panel, and the connector having first contacts seated in said body along said socket for providing electrical connection between wire wrap terminals on the contacts exposed on the other side of the panel and said edge contacts, the improvement comprising A. first means on said connector for mountingly attaching a bus conductor thereto disposed outside and longitudinally beyond said socket and on said one side of said panel, B. an elongated electrical bus conductor extending transverse to said longitudinal dimension of said socket on said one side of said panel and engaged with said first means for mounting attachment to said connector, C. second means on said connector for carrying a distribution conductor therewith disposed outside and longitudinal to said socket on said one side of said panel, D. means forming an elongated distribution conductor mountingly-engaged with said second means and electrically connected with said bus conductor and extending therefrom longitudinal to said socket insulated from said first contacts, and E. means forming at least one distribution contact seated on said connector along said socket in-line with said first contacts and in electrical contact with said distribution conductor for providing electrical connection between said distribution conductor and an edge contact of said printed circuit structure.

9. In connector apparatus as defined in claim 8, the further improvement wherein A. said distribution conductor extends longitudinally past, and is electrically insulated from, a plurality of said first contacts seated along said socket, and B. said distribution contact is a separate element from said distribution conductor and is seated in said socket in lieu of one said first contact.

10. In electrical apparatus as defined in claim 8, the further improvement wherein A. said first means forms a bus conductor-seating recess in said connector body opening in the same direction as said socket and extending through the width dimension of said receptacle body, and B. said second means forms an elongated distribution conductor-seating recess in said connector body opening in the same direction as said socket and longitudinally extending from said recess of said first means coextensive with said socket.

11. In electrical connector apparatus for printed circuit structures having electrical edge contacts, and having a connector with an electrically-insulating body recessed with a longitudinal socket and for mounting at a reference surface with said socket facing from one side of said surface, and the connector having first contacts seated in said body along said socket for providing electrical connection between wire wrap terminals on the contacts exposed on the other side of said surface and said edge contacts, the improvement comprising A. means forming a conductor-seating slip on said connector, said clip
   1. being disposed outside and longitudinally beyond said connector socket and on said one side of said surface, and
   2. forming a conductor-seating first recess facing in the same direction as said socket and longitudinally extending transverse to said socket elongation and across the width of said connector body, B. an elongated bus conductor seated in said first recess and mountingly disposed thereby on said one side of said surface and extending transverse to said connector socket, C. means forming a slot-like conductor-seating second recess in said connector body, said second recess
   1. facing in the same direction as said socket,
   2. longitudinally extending parallel to said socket with first contacts between said socket and said second recess, and
   3. opening at one end thereof into said first recess, D. a distribution conductor seatingly disposed in said second recess and in electrically-connecting engagement with said bus conductor, and E. at least one distribution contact seated in said connector body in lieu of a first contact and in line with other first contacts and in electrical contact with said distribution conductor for providing electrical connection between said distribution conductor and an edge contact of said printed circuit structure.

* * * * *

UNITED STATES PATENT OFFICE
CERTIFICATE OF CORRECTION

Patent No. 3,725,843 Dated April 3, 1973

Inventor(s) Lennart B. Johnson

It is certified that error appears in the above-identified patent and that said Letters Patent are hereby corrected as shown below:

Column 7, line 50, change "atone" to --at one--.

Column 8, line 5, change "attacheS" to --attaches--.

Column 8, line 28, "connector body 70" should be --connector 70 body--.

Column 8, line 33, change "receSsing" to --recessing--.

Column 8, line 35, insert --the-- after"alongside".

Column 9, line 24, change "upWard" to --upward--.

Column 9, line 44, change "doWn" to --down--.

Column 9, line 49, change "tuP" to --this--.

Column 9, line 52, change "carrIed" to --carried--.

Column 9, line 61, change "contactS" to --contacts--.

Column 10, line 22, change "Stamped" to --stamped--.

Signed and sealed this 6th day of August 1974.

(SEAL)
Attest:

McCOY M. GIBSON, JR.
Attesting Officer

C. MARSHALL DANN
Commissioner of Patents